(12) United States Patent
Rezvani et al.

(10) Patent No.: US 12,209,879 B2
(45) Date of Patent: Jan. 28, 2025

(54) AUTOMATED MAPPING OF SENSORS AT A LOCATION

(71) Applicant: Alarm.com Incorporated, Tysons, VA (US)

(72) Inventors: Babak Rezvani, Tysons, VA (US); Glenn Tournier, Tysons, VA (US); Donald Gerard Madden, Columbia, MD (US); Ahmad Seyfi, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/078,355

(22) Filed: Oct. 23, 2020

(65) Prior Publication Data

US 2021/0123768 A1 Apr. 29, 2021

Related U.S. Application Data

(60) Provisional application No. 62/924,971, filed on Oct. 23, 2019.

(51) Int. Cl.
*G01C 21/00* (2006.01)
*G01C 21/20* (2006.01)
*G05D 1/00* (2024.01)
*B64U 10/13* (2023.01)
*B64U 101/32* (2023.01)

(52) U.S. Cl.
CPC ......... *G01C 21/383* (2020.08); *G01C 21/206* (2013.01); *G01C 21/3848* (2020.08); *G05D 1/0094* (2013.01); *G05D 1/101* (2013.01); *B64U 10/13* (2023.01); *B64U 2101/32* (2023.01)

(58) Field of Classification Search
CPC ................ G01C 21/383; G01C 21/206; G01C 21/3848; G05D 1/0094; G05D 1/101; B64C 2201/127; B64C 2201/14; B64C 39/024
See application file for complete search history.

(56) References Cited

U.S. PATENT DOCUMENTS

| | | | |
|---|---|---|---|
| 9,386,281 B2 | 7/2016 | Trundle et al. | |
| 9,643,722 B1 | 5/2017 | Myslinski | |
| 10,467,891 B1 | 11/2019 | Bart et al. | |
| 10,650,666 B1 | 5/2020 | Bart et al. | |
| 10,769,844 B1 * | 9/2020 | Rezvani | G06V 20/10 |

(Continued)

*Primary Examiner* — Abdalla A Khaled
(74) *Attorney, Agent, or Firm* — Fish & Richardson P.C.

(57) ABSTRACT

Methods, systems, and apparatus, including computer programs encoded on a computer storage medium, are described for performing automated mapping of sensors at a location of a property. A monitoring server of a system for monitoring a property obtains mapping information that indicates navigable areas at the property. A drone that communicates with the monitoring server is used to navigate the property. In response to the drone navigating the property, sensors and their respective location at each navigable areas are identified based on the mapping information. The monitoring server associates sensors at each area with a corresponding location of the sensor in a data model of the property. Labels descriptive of the respective sensors are generated based on the location of the identified sensors. The monitoring server determines a mapping of a label to a respective sensor associated with the data model of the property.

21 Claims, 3 Drawing Sheets

(56) References Cited

U.S. PATENT DOCUMENTS

| | | | |
|---|---|---|---|
| 10,890,910 B1* | 1/2021 | Bart | G05D 1/227 |
| 11,017,680 B2* | 5/2021 | Trundle | F41H 11/00 |
| 11,442,136 B2* | 9/2022 | Nurminen | G01S 5/02526 |
| 11,501,492 B1* | 11/2022 | Li | G06T 7/55 |
| 2010/0109842 A1* | 5/2010 | Patel | G01C 21/206 |
| | | | 340/10.1 |
| 2013/0297198 A1* | 11/2013 | Vande Velde | G01C 21/28 |
| | | | 701/409 |
| 2016/0195400 A1* | 7/2016 | Young | G01S 19/13 |
| | | | 701/409 |
| 2016/0282126 A1* | 9/2016 | Watts | G06Q 10/08 |
| 2017/0031925 A1* | 2/2017 | Mishra | G06F 16/444 |
| 2017/0225321 A1* | 8/2017 | Deyle | G06K 7/10297 |
| 2017/0370728 A1* | 12/2017 | Kordari | G01C 21/383 |
| 2018/0081363 A1* | 3/2018 | Qu | G05D 1/0033 |
| 2018/0283882 A1* | 10/2018 | He | H04L 67/30 |
| 2018/0329617 A1* | 11/2018 | Jones | H04W 4/70 |
| 2019/0080170 A1* | 3/2019 | Baca | G06V 20/70 |
| 2019/0188477 A1* | 6/2019 | Mair | G06V 20/64 |
| 2019/0236732 A1* | 8/2019 | Speasl | G05D 1/101 |
| 2019/0347924 A1 | 11/2019 | Trundle et al. | |
| 2020/0041560 A1* | 2/2020 | Schwartz | G01R 31/086 |
| 2020/0116493 A1* | 4/2020 | Colburn | G06F 18/253 |
| 2020/0183429 A1* | 6/2020 | Ottenheimer | G05D 1/104 |
| 2020/0311378 A1* | 10/2020 | Kerzner | G06V 20/13 |
| 2020/0394898 A1* | 12/2020 | Roberts | G08B 19/00 |
| 2021/0240206 A1* | 8/2021 | Michini | G01C 15/02 |
| 2022/0005332 A1* | 1/2022 | Metzler | G06F 18/2431 |

* cited by examiner

AUTOMATED MAPPING OF SENSORS AT A LOCATION

CROSS REFERENCE TO RELATED APPLICATION

This application claims the benefit of U.S. Provisional Application No. 62/924,971, filed on Oct. 23, 2019, which is incorporated herein by reference in its entirety.

FIELD

This specification relates to sensors for a property.

BACKGROUND

Monitoring devices and sensors are often dispersed at various locations at a property, such as a home or commercial business. These devices and sensors can have distinct functions at different locations of the property. Some sensors at a property offer different types of monitoring and control functionality. The functionality afforded by these sensors and devices can be leveraged to secure items at a property, to obtain information about respective items at multiple different properties, and to control certain safety devices that may be located at the properties.

SUMMARY

This document describes techniques for improved automated mapping of one or more labels to a corresponding sensor disposed at a location such as a commercial or residential property. A drone or similar robotic device is operable to navigate a property that includes multiple sensors and other devices or features that may be disposed at various locations at the property. The drone is operable to identify each sensor or device at the property as well as a respective location of each sensor. The drone automatically determines a mapping of specific labels to sensors (or vice versa), where the labels indicate a type or location of the sensor.

For example, the drone is configured to determine which sensors (e.g., a motion sensor) at the property correspond to a particular label (e.g., hallway motion sensor) in a label set that is generated for the property. The drone can also determine a cross mapping of each sensor location to a particular area in multi-dimensional model of the property. In some cases, a model that includes mapped locations of sensors at a property can be queried by a user. For example, the user may seek to determine if a sensor is disposed at a certain area of the property or the particular type of sensor that is present at a given location of the property.

The user can submit a query (e.g., "what type of door sensor is installed at the front door?") to a system that is configured to access the multi-dimensional model. The system can pass the query to the model for processing at the model to determine a response, which may be based in part on the automated mapping of sensor locations at the property.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

BRIEF DESCRIPTION OF THE DRAWINGS

Like reference numbers and designations in the various drawings indicate like elements.

DETAILED DESCRIPTION

Figure 1:
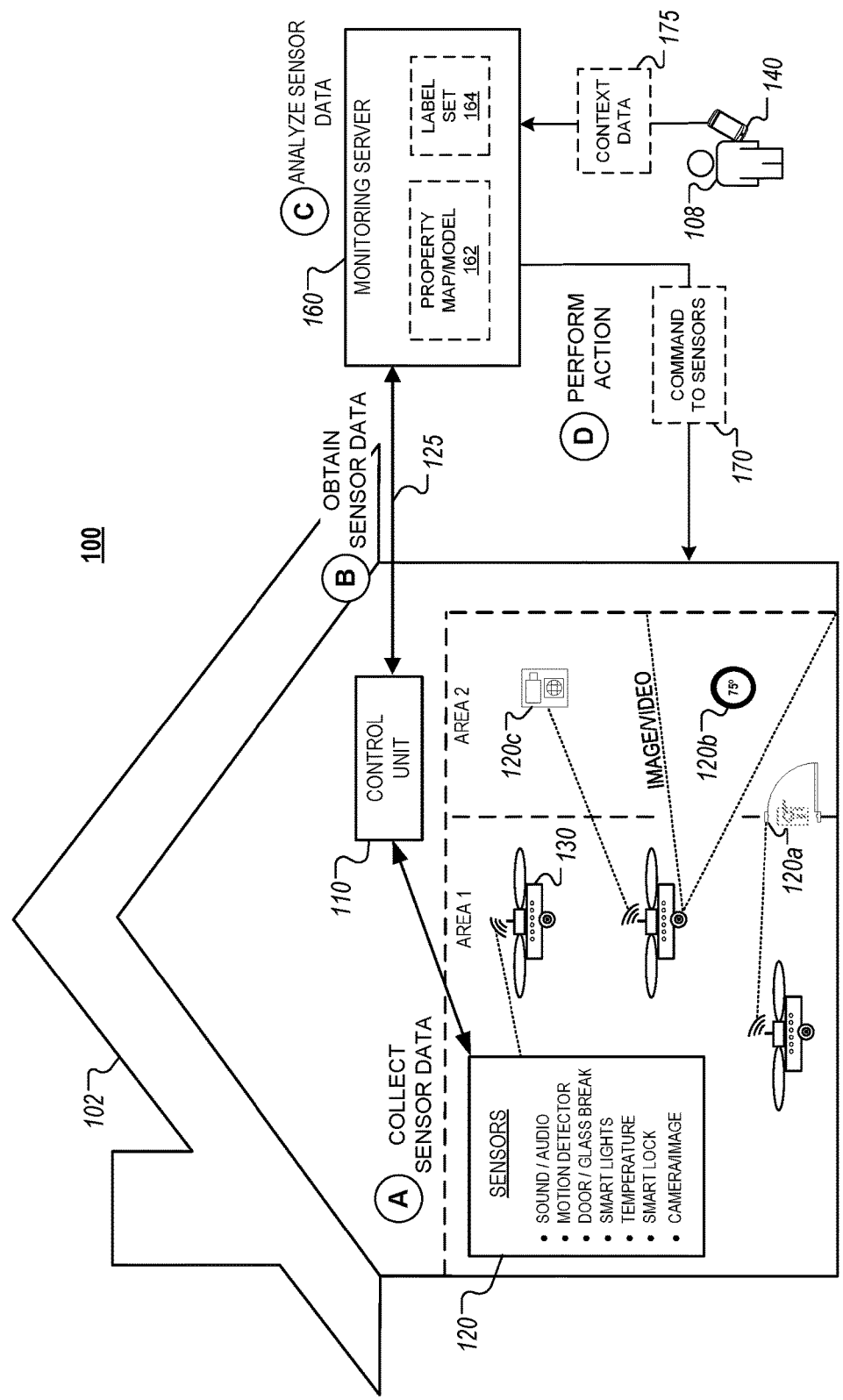
FIG. 1 shows a block diagram of an example property and system for mapping sensors at a property.

A property, such as a house or a place of business, can be equipped with a property monitoring system to enhance the security of the property.

The property monitoring system may include one or more sensors, such as motion sensors, camera/digital image sensors, temperature sensors, distributed about the property to monitor conditions at the property. In many cases, the monitoring system also includes a control unit and one or more controls which enable automation of various actions at the property. In general, a security, automation, or property monitoring system may include a multitude of sensors and devices that are placed at various locations of a property to perform specific functions. These sensors and devices interact with the control units to provide sensor data to a monitoring server and to receive commands from the monitoring server.

Accurate labeling and mapping of sensors at a property can provide useful information about the sensors, such as a location, type, status, and capabilities of each sensor disposed at the property. However, prior approaches for labelling and mapping each sensor to provide insights to a user of a monitoring system are often time consuming and labor intensive. Hence, the steps of labeling and mapping the sensor are frequently skipped or performed erroneously by a user. For example, a house may have 30 windows and 9 doors. A contact sensor may be installed at each of the windows or doors to provide an important safety function such as to report that the window or door is in an open or closed state.

Relying on manual labeling of these contact sensors can result in a generic list of non-descriptive labels that is not particularly useful to the homeowner. For example, this list can include generic labels such as "Living Room Window 1," "Living Room Window 2," etc, which provides little or no insight about the type or capability/functions of the sensor. In some cases, the list of labels may be riddled with obscure or confusing descriptors such as "Sensor 3EA45B," or "Sensor 4B329E." These labels make it difficult for a user/homeowner to know exactly which window is open or which sensor is reporting the information about the window being open, or whether the user should even care about such information. These unclear and ineffective labels can also make it difficult to configure a monitoring system to perform useful actions based on information reported by the sensors or to determine helpful relationships between different types of sensors at the property.

In this context, techniques are described for implementing drone or robot assisted mapping of sensors at a property. The techniques described in this specification provide methods for automated mapping of each sensor, device, or component of a property monitoring system to a multi-dimensional map of the property. In particular, the described techniques can be used to apply meaningful (e.g., descriptive) and coherent labels to specific sensors at the property. The techniques can be also used to configure and apply useful metadata with respect to the sensors, which can provide more contextual insights about the sensors to both users and system algorithms. Based on the techniques, a user that is concerned about securing exterior doors at a property, but not interior doors being opened or closed, can effectively leverage the improved labeling and registration of sensors (for each door or type of door) to apply rules that address the specific concerns of the user.

FIG. 1 shows a block diagram of an example property monitoring system 100 ("system 100") that can be used to perform one or more actions for securing a property 102 and for improving the safety of one or more occupants at the property 102. The property 102 may be, for example, a residence, such as a single family home, a townhouse, a condominium, or an apartment. In some examples, the property 102 may be a commercial property, a place of business, or a public property, such as a police station, fire department, or military installation.

The system 100 can include multiple sensors 120. Each sensor 120 can be associated with various types of devices that are located at property 102. For example, a sensor(s) can be associated with contact sensor 120a that is operable to detect when a door or window is opened or closed. Sensors 120 may be referred to alternatively as devices 120 for certain examples or embodiments that illustrate the different mapping operations that can be performed using the described techniques. In some examples, a sensor can be a temperature control device 120b that is operable to control a temperature setting for an area or room at the property 102. Similarly, a sensor can be associated with a video or image recording device 120c located at the property 102, such as a digital camera or other electronic recording device.

As described above, the property 102 is monitored by a property monitoring system. The property monitoring system includes a control unit 110 that sends sensor data 125, obtained using sensors 120, to a remote monitoring server 160. The system 100 also includes a drone 130 that is operable to generate mapping data which may be transmitted as sensor data 125 to the monitoring server 160. The mapping data can be processed at the monitoring server 160 to determine a mapping of sensors 120 at the property 102. In some implementations, the control units, monitoring servers, or other computing modules described herein are included as sub-systems of the property monitoring system 100.

Each of the sensors 120 can use various types of technology to transmit sensor signal data or to exchange data communications with devices of system 100 (or the property monitoring system). In some implementations, one or more sensors 120 at the property 102 can be at least one of: a Z-Wave enabled sensing device, a Bluetooth enabled sensing device, a Wi-Fi enabled sensing device, or a sensing device that uses radio or wireless signal technology. Additional sensor features are described in more detail below.

A drone 130 or other robot 130 is used to survey the property 102 and build a multi-dimensional map 162, such as a two-dimensional (2D) or three-dimensional (3D) model that includes 2D/3D map or physical layout of the property 102. In some implementations, the drone 130 surveys the property 102 and obtains data for generating the map/model 162 using techniques such as simultaneous localization and mapping (SLAM). In some implementations, the drone 130 surveys the property 102 and transmits various types of parameters (or parameter values), sensor/drone data, and status information to the monitoring server 160 to generate the multi-dimensional model 162.

For example, the drone 130 is operable to transmit: (i) parameter signals that characterize a status or attribute of the sensors 120, (ii) data that describes communications and interactions between the drone 130 and each of the sensors 120, and (iii) imagery data ("mapping data") about the property 102 and sensors 120, to the monitoring server 160 to generate the multi-dimensional model 162. In some examples, the drone 130 interacts with the monitoring server 160 to generate portions of the model 162 concurrent with the drone 130 performing the survey of property 102.

Additionally, generating the multi-dimensional model 162 can include generating a topological graph that is configured to show one or more relationships between each sensor 120 and a particular navigable space of the property 102. In some implementations, the topological graph is operable to allow algorithmic analysis of the property 102 as various sensors 120 report sensor data to the monitoring server 160.

During the course of this survey, such as while building the multi-dimensional model 162 or as a second pass to collect additional data for generating the map, the drone 130 is operable to interface with one or more sensors 120 or components of an installed security/monitoring system (e.g., system 100) of the property 102. For example, the drone 130 will attempt to discover each sensor 120, such as by identifying and locating each sensor 120 at the property 102. In some implementations, the drone 130 is operable to register, to the multi-dimensional model 162, each identified sensor 120 or component of the installed system 100.

For example, at least one drone 130 is configured to register itself to a multi-dimensional model 162 using the SLAM techniques described above as well as other known localization methods. In response to its self-registration, the drone 130 can then determine an estimate of a relative transformation between the drone 130 and a sensor 120 via the described localization and mapping methods. The drone 130 is operable to then use this transformation to determine an estimated location or position of the sensor 120 and register that estimated location or position of the sensor 120 to the multi-dimensional model 162.

To identify and locate sensors 120 at the property 102, the drone 130 can receive a list of devices or sensors (e.g., sensors 120a, 120b, and 120c) from a component of system 100. For example, the drone 130 can receive the list of devices from the monitoring server 160 via a secure or authenticated network connection. In some implementations, receiving the list of sensors 120 can include receiving information such as sensor type, sensor model, sensor capabilities, sensor status, or other information pertaining to various attributes of each sensor 120. The drone 130 can receive the list of sensors 120 before starting a discovery process to identify and locate the sensors 120, during the discovery process, or both.

For radio-equipped devices/sensors 120 (e.g., equipped with Z-Wave, WiFi, etc.), the drone 130 is operable to determine or compute signal strength triangulation, time-of-flight, or network topology and can use these determinations to identify and locate a specific sensor disposed at the property 102. In some implementations, in response to locating a sensor, such as sensor 120b, the drone 130 will attempt to obtain a visual confirmation of the sensor's location. For example, the drone 130 can be configured to include an imaging device, such as a digital camera, for recording imagery and video data of a sensor 120 to obtain visual confirmation of a sensor's computed location. In some cases, radio triangulation may lead to ambiguities or uncertainty about which side of a wall a sensor 120 is mounted. In these cases, the drone 130 is operable to investigate multiple potential locations before referencing each computed location value to determine the most likely wall position of the sensor 120.

In some implementations, devices and sensors 120 at a property 102 may not be equipped with wireless or radio functionality, or a sensor 120 may be configured to keep its wireless and radio functions disabled until triggered by an example sensor input from the drone 130. For these types of sensors 120, the drone 130 may be operable to use a visual discovery mode, a triggered sensor discovery mode, or both, to perform sensor discovery.

Regarding the visual discovery mode, the drone 130 is operable to run an object detection neural network (e.g., a deep neural network) to identify and locate one or more sensors 120 at the property 102. The object detection neural network can be trained on images (or 3D models) of each sensor or device and can be run on frames of video or imagery data collected by the drone 130 to discover and localize the sensors 120. In some implementations, the type and/or model of a sensor 120 can provide an indication to the drone 130 that specifies where the drone should direct its imaging sensors to obtain a visual of the sensor 120. In some implementations, one or more initial labels (e.g., "kitchen window 3") that may have been applied to a sensor 120 can also provide an indication to the drone 130 about where to look or where to direct its imaging sensor/device (e.g., by orienting or focusing its imaging device) to obtain a visual of the sensor 120. For example, the drone may obtain, from the monitoring server 160, mapping information about the property 102. The mapping information indicates multiple navigable areas at the property 102 and can include data that describes a list of devices or sensors (e.g., sensors 120*a*, 120*b*, and 120*c*) at the property 102. In some cases the mapping information includes an initial label for one or more of the devices.

In some implementations, at least for a door contact sensor 120, the drone 130 may initially detect doorways—which are much larger and typically easier to detect from afar—associated with the contact sensor 120*a* and then move closer to the sensor to perform a localization function to detect the contact sensor 120. In other implementations, this and similar approaches for localization and visual detection of a door contact sensor apply also to windows or any other architectural feature, e.g., eaves, interior corners, etc., that can be associated with placement of sensors 120 about the property 102.

After performing the localization function, the drone 130 might move even closer to scan for an identifier, QR code, or other related tag that can be used to ascertain an identity or descriptor of the sensor 120. In some implementations, the drone 130 is operable to use an observed state of the door (e.g., opened or closed) to visually identify and locate the sensor 120. In some cases, the drone 130 can use sensor status information, e.g., whether two parts of a contact sensor are touching, as a check against or validation of the sensors' reported state. In this manner, if a door is closed but a contact sensor 120 attached at the door appears to be reporting that the door is open, then the drone 130 and system 100 can determine that the drone is either looking at the wrong sensor 120 or that the sensor is malfunctioning.

Alternatively, the system 100 can include an example drone 130 that is equipped with an arm to open and close doors. The system 100 can transmit commands or control signals to this drone 130 to cause the arm of the drone to open a door or close a door, thereby triggering/activating a contact or door sensor 120*a* at the property. This example drone may only fly, may only move about on the ground, or may do both. In some implementations, the drone 130 is implemented as a ground-based rover that is equipped with an arm (e.g., a moveable arm). In some other implementations, the system 100 transmits the commands or control signals to this drone 130 and other drones by way of another device at the property 102.

Regarding the triggered sensor discovery mode the sensors 120 can also be discovered and mapped by triggering the sensors 120 with the drone 130 or robot and watching the system's sensor readouts for each triggered change. In particular, the triggered change in the sensor readouts can be used as part of a mapping function of system 100 to map the sensors 120 to the multi-dimensional model 162. For example, the drone 130 might fly through a house and the system 100 is operable to note the drone's position each time a motion sensor trips. These types of triggered functions and corresponding annotations can be referenced to determine an approximate location of each sensor 120. In some implementations, the determined approximate locations can then be refined or confirmed visually or by traversing the area with the drone 130.

The drone 130 can be configured to include a heat source to aid in the triggering of passive infrared sensor ("PIR") sensors 120. In general, a PIR sensor 120 is an electronic sensor that measures infrared light radiating from objects in its field of view. In some cases, PIR sensors 120 are most often used in PIR-based motion detectors and may be commonly used in security alarms and automatic lighting applications. In some implementations, a drone 130 can be configured to include a small electromagnet to trigger a leaf switch in an example PIR sensor 120.

Similarly the drone 130 can be used or controlled to trigger smoke detectors or heat detectors using the example heat source. The drone 130 can also trigger camera sensors in response to communicating with the camera sensor, for example, based on control signals transmitted. The drone 130 is operable to trigger glass break sensors, e.g., by using a prerecorded sound that mimics a sound profile or wave of a glass breaking so as to trigger the glass break sensor 120.

In some implementations, the system 100 is operable to communicate with a given sensor 120 to change or configure one or more settings of the sensor ("sensor settings"). For example, the system 100 can make changes to the sensor settings based on the discovered location of the sensor or a topology of sensors 120 at the property 102. The topology of sensors can correspond to a group of sensors connected via a local or wide-area Wi-Fi network at the property 102, such as a sensor network at the property. In some cases, the sensor settings are changed/configured once a mapping of one or more sensors is complete. In some other cases, the sensor settings of one or more sensor are changed/configured concurrent with locating, identifying, or mapping a respective sensor.

With regard to changing or configuring a sensor setting, as an example, the system 100 might configure a set of motion sensors to have a first detection sensitivity. The system 100 may then later determine to turn down the detection sensitivity of all motion sensors at a south side of the property 102 due to the way sunlight hits a photodiode installed at the motion sensors. The system 100 can perform the change or configuring of the sensor settings based on operations performed by the monitoring server 160, the drone 130, or both.

Each sensor 120 can be set by the system 100 for maximum sensitivity to aid in the sensor discovery process, particularly if the drone 130 is relatively small in size and is less likely to set-off or trigger a given sensor 120, or if the sensors 120 are highly selective. The sensor sensitivities can be adjusted as needed during the discovery process to determine realistic fields of view or ranges, or to resolve ambiguities when multiple sensors trip simultaneously. Regarding selective sensors, in some implementations video analytics alerts on an example camera sensor 120c might not trip or trigger that sensor, but video motion detection sensing on the camera sensor 120c that is set to high sensitivity might be more easily triggered.

In some implementations, triggering a sensor 120, such as one that is set to maximum sensitivity, to discover or locate the sensor can occur cross-sensors. The cross-sensor triggering may be based in part on a minimum proximity or minimum threshold distance (e.g., less than 5 feet) between the sensors 120 such that the system 100 knows that the sensors 120 are sufficiently close to be able to perform cross-sensor triggering. For at least two distinct sensors 120, the system 100 is operable to determine that the two sensors are nearby each other based at least on similar names or labels that have been applied to the sensors. For example, each of a camera sensor 120c and a motion/contact sensor 120a can be applied the label "den" or "living area 1," which might indicate that these sensors are sufficiently close to one another in a den at the property 102. In some cases, the system 100 is operable to determine that the two sensors are nearby (e.g., within a few feet or inches) each other based at least on related network indicators of a mesh network topology or similar signal strength indications determined for the two sensors.

Automation devices 120, such as automatic blinds or automated smart lights, can be discovered via similar methods as described above. For example, these methods can include triangulating the network devices or finding a device visually. In some instances, a smart light that is controlled via a networked switch is often disposed in a different location than the smart/networked switch. In some implementations, and for these types of automation devices, the system 100 is operable to toggle the automation device once the drone 130 is nearby or within a threshold proximity of the device 120. The drone 130 can then note the location of both the device 120 and itself as well as other attached devices that are being affected. The drone 130 is operable to note even the area being covered by the automation device 120. For example, the drone is operable to determine how much of a room is covered by light from the smart light and then annotate the multi-dimensional model 162 to reflect this determination.

The drone 130 is operable to also discover sensors 120 that have not yet been added to the system 100 (or that have gone offline), and can be used to aid in the installation and configuration of those sensors 120. Each located sensor 120 would then be registered to the multi-dimensional model 162. In some implementations, registering a sensor 120 to the multi-dimensional model 162 includes storing a confirmation image that was obtained when the sensor 120 was identified and located at the property 102. The system 100 is operable to display a version of the multi-dimensional map/model 162 to users 108 and to show the location and status of each drone or sensor 120.

Each of the drone 130 and sensors 120 are operable to receive commands 170 and other signals from the monitoring server 160 or from a client device 140 of a user 108. In some implementations, the command 170 is a data payload that includes instructions and data values for commanding the drone 130 or sensors 120 to perform one or more specific functions at the property 102. For example, a command 170 can cause the drone 130 to travel to a particular sensor 120 or area of the property 102, triggering of a particular sensor 120 at the property 102, or transmitting of mapping data from the drone 130 to generate the multi-dimensional model 162 or label set 164.

As described in more detail below, information associated with the multi-dimensional map as well as additional contextual data/inputs 175 received from the client device 140 of the user 108 (e.g., a homeowner or system installer), is used to map a meaningful label to each sensor. In some implementations, information or context data 175 learned from similar properties can also be used to determine a meaningful label for mapping to a particular sensor.

When the multi-dimensional model 162 is generated and each sensor 120 is registered to the multi-dimensional model, the system 120 can obtain one or more labels from label set 164 and then apply smart contextual labels to each of the sensors 120. These contextual labels can be based on labels of rooms given by a user or installer, based on context data 175, combined with data about how a multi-dimensional map 162 of the property 102 is oriented in the real world as well as the type of sensor/device. An example smart contextual label can include "Bob's Bedroom, East Window: open."

In some implementations, the labels of label set 164 can also be inferred or generated from the plans for a building, from labels discovered and Optical Character Recognized (OCR'd) by the drone 130 (such as apartment or room numbers), or by performing a visual scene analysis to label a room at the property 102. In some cases, the visual scene analysis can include detecting key objects in a room, e.g., a bed in a bedroom or a stovetop in a kitchen, or performing a more holistic scene segmentation and classification. Hence, the system 100 can be configured to automatically generate labels such as "Suite 406, Bathroom smoke alarm" based at least on these different methods.

Referring again to the object detection model, the system 100 can use information obtained during a visual discovery mode to generate a set of labels. For example, to generate a label set, an object detection neural network can infer one or more labels of the label set based on a visual scene analysis of a room in which a sensor is located as well as information indicating a particular type of the room. The information indicating the particular type of the room can be obtained from the mapping information described above, input manually by a user, obtained from context data, or a combination of each. Using this method, the system 100 can generate the label set using one or more labels that are inferred by the object detection neural network based on the particular type of the room and imagery data obtained during visual observation of the sensor in the room as well as other aspects of the room.

The drone 130 can be used to execute or run the object detection neural network, which may be trained on images of sensors at different locations of the property 102. The object detection neural network processes multiple frames of imagery data generated by an on-board imaging sensor of the drone. For instance, the object detection neural network can use item recognition to identify known items of a room, such as a toilet in a bathroom, a large sink or fridge in a kitchen, a large window adjacent a sofa in a living room, to assess or detect an overall scene of the room. The object detection neural network processes the multiple frames of imagery data during visual scene analysis performed by the drone 130 to generate labels in response to analyzing identified items with reference to a detected scene in an area or location of the property.

The object detection neural network computes sets of inferences that can be used to generate the labels in response to processing the multiple frames of imagery data. In some cases, the object detection neural network computes inferences about sensors in the area of the property concurrent with performing the visual scene analysis. The computed inferences may include numerical and other parameter values that are descriptive of the sensors and the area in which sensors are located. The inferences can indicate terms to be included in a corresponding label for the sensor.

Figure 2:
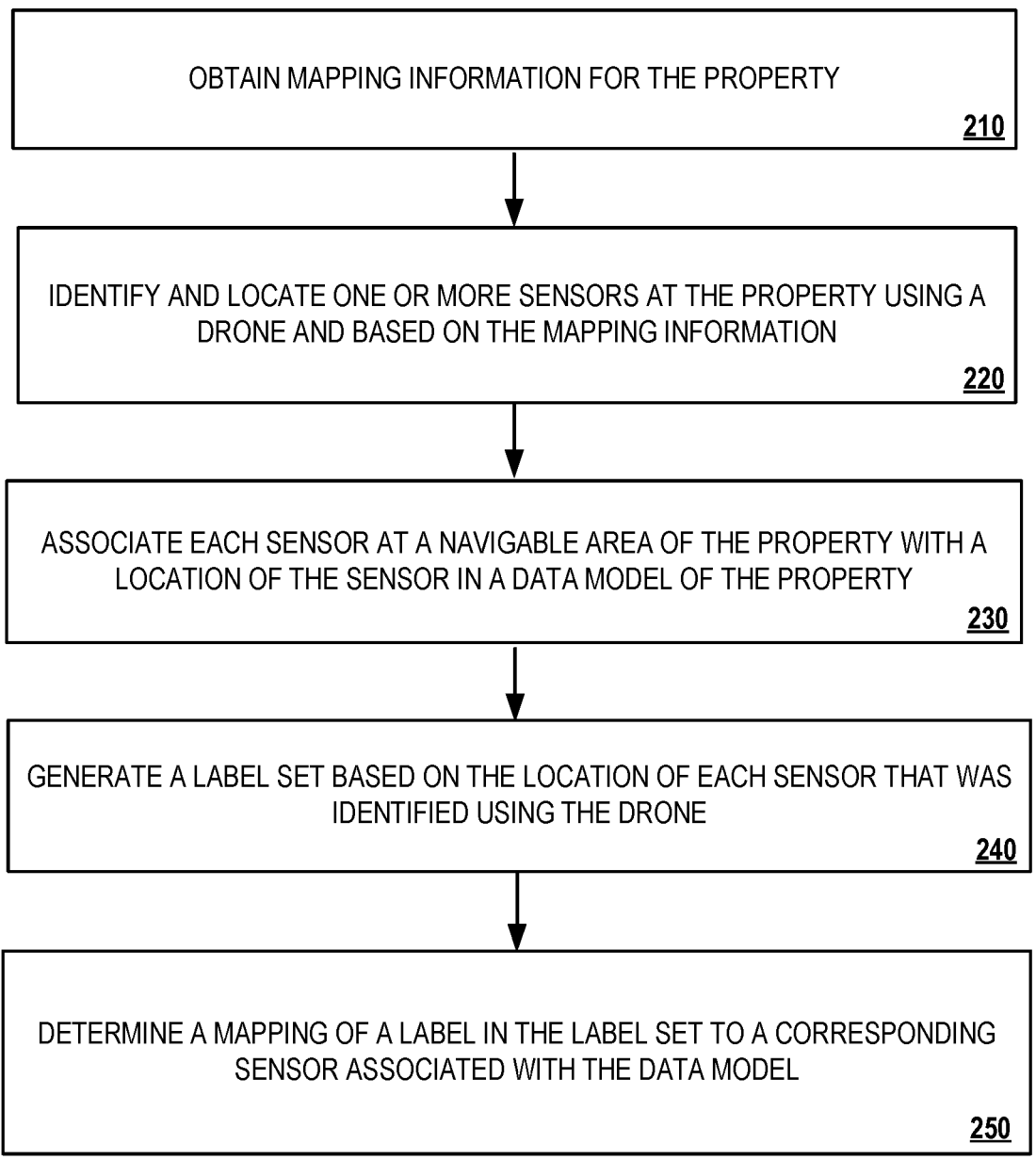
FIG. 2 shows an example process for mapping sensors at a property.

FIG. 2 shows an example process 200 for mapping sensors at a property. In general, process 200 can be implemented or performed using the systems, components, computing servers, and devices described in this document. Descriptions of process 200 may reference one or more of the above-mentioned computing resources of system 100. In some implementations, steps of process 200 are enabled by programmed software or instructions stored in a non-transitory machine-readable storage medium that are executable by processing devices of the sensors, components, systems described in this document.

Referring now to process 200, system 100 obtains mapping information that indicates multiple navigable areas at the property 102 (210). System 100 obtains the mapping information based on operations performed by the monitoring server 160 and the drone 130. In some implementations, the drone 130 can obtain the mapping information in response to receiving or accessing data that describes a list of devices or sensors (e.g., sensors 120a, 120b, and 120c) from a component of system 100. The drone 130 can receive the list of sensors 120 before starting a discovery process to identify and locate the sensors 120, during the discovery process, or both. In some implementations, receiving the list of sensors 120 can include receiving information such as sensor type, sensor model, sensor capabilities, sensor status, or other information pertaining to various attributes of each sensor 120. The mapping information can include portions of context data 175 obtained from a user.

As described in more detail below, the system 100 is configured to generate a multi-dimensional map of a property using data (e.g., mapping information) obtained by drone 130, context data 175 for the property, or both. For example, the system 100 is operable to generate the multi-dimensional map using parameter signals, sensor communications, and imagery data obtained by drone 130. In some examples, system 100 generates the multi-dimensional map using signals and imagery associated with the sensors 120 and context data inputted by a user that describes attributes of the property. The multi-dimensional map may be integrated in a multi-dimensional model of the property that is generated based on machine-learning operations performed using an object detection neural network of the system 100.

The context data includes information associated with the user or information associated with sensors at the property 102. For example, the context data can be: a location of the user at the property as emitted by a device of the user; metadata tags embedded in sensor data 125 transmitted by the sensors; metadata included in data structures of a multi-dimensional map of the property; or a combination of these. The context data can also include parameters input by a user. The parameters can indicate some (or all) of the following: the user's location within the property, a particular type of a room at the property 102, describe attributes of an area at the property 102.

In some implementations, the user 108 is a property owner or resident that communicates within system 100 through a software ("smart home") application installed on their mobile device 140. The user 108 may provide the inputs using the application. In some cases, the multi-dimensional map (or model) of the property is presented for output to a user 108 through the smart home software application installed on the user's mobile device 140. The map of the property can indicate rooms or areas of a floorplan of the property. The user 108 may input context data as an overlay to the multi-dimensional map to specify different attributes of an area at the property, which may be used to generate a label for a sensor at the area.

The system 100 identifies and/or locates one or more sensors at the property (220). The system 100 can use the obtained mapping information to identify and locate sensors 120 at the property 102. For example, the drone 130 can receive the list of devices representing the mapping information from the monitoring server 160 via a secure or authenticated network connection. The drone 130 can reference the list as the drone navigates the property to its various signal communications, localization, and triangulation to locate and identify the different sensors that may be installed at the property 102.

The system 100 associates each sensor at a navigable area of the property with a location of the sensor in a data model of the property such as the multi-dimensional model described above (230). In some implementations, the monitoring server 160 registers each sensor to the multi-dimensional map integrated in the data model to associate each of the identified sensors to a respective navigable space at the property. The monitoring server 160 can use the drone 130 to perform sensor discovery at the property 102 based on a visual discovery mode, a triggered sensor discovery mode, or both. Signal transmissions of the drone 130 that are generated as outputs of these discovery modes are used by the monitoring server 160 to associate the sensors with locations in the data model as well as to confirm identification of a sensor in response to navigating the property using the drone.

The system 100 generates a label set based at least on the location of each sensor that was identified using the drone (240). In some implementations, the monitoring server 160 can generate the label set based on the multi-dimensional map, each of the registered sensors 120, and the context data 175 for the property. The labels in the label set can include descriptors, type indicators, status information, or capabilities of a sensor. Each of the labels can be mapped to a sensor 120 to describe an attribute of the sensor. The system 100 is configured to determine a mapping of a particular label in the label set to a corresponding sensor registered in the multi-dimensional map (250).

Figure 3:
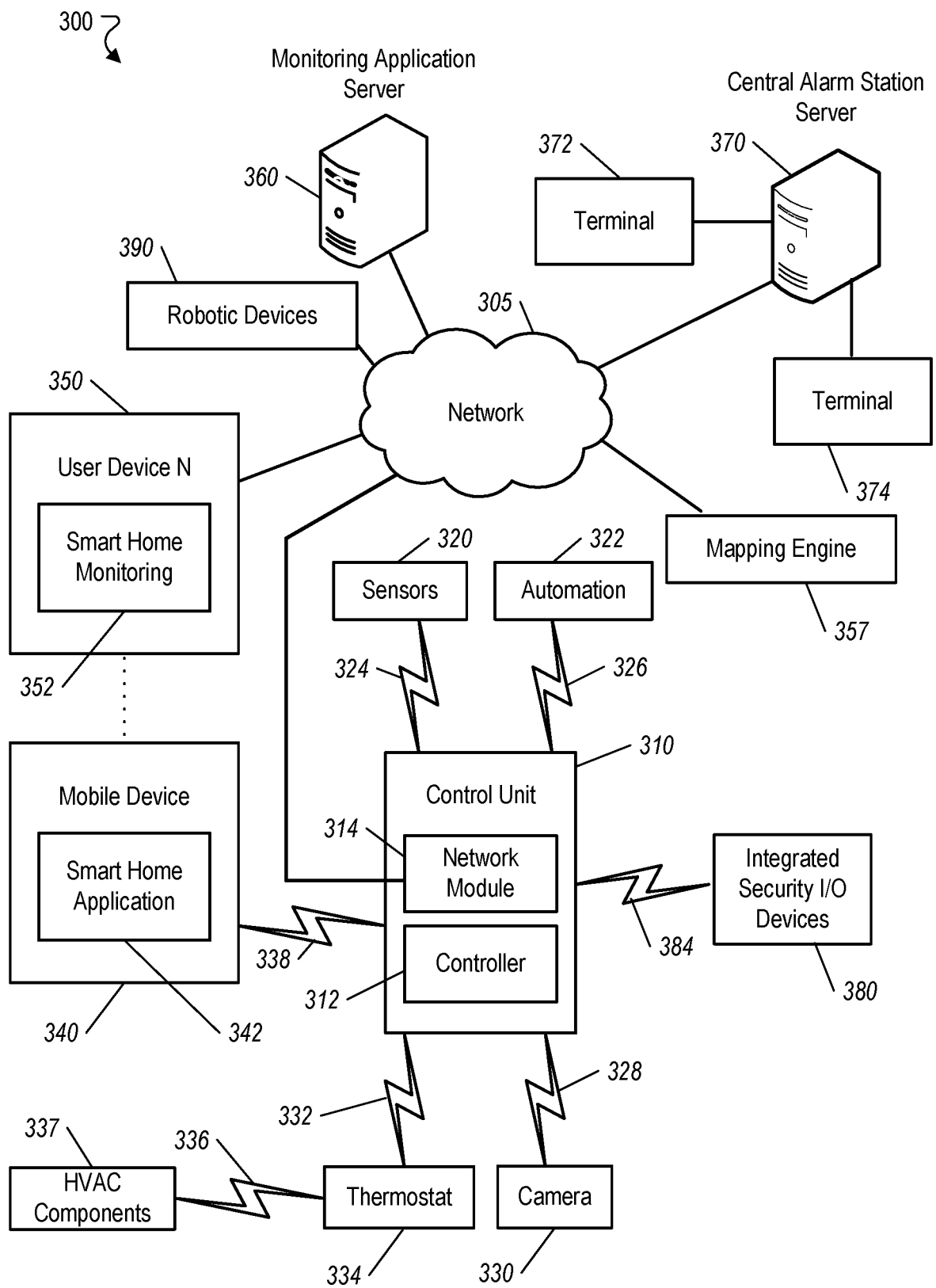
FIG. 3 shows a diagram illustrating an example property monitoring system.

FIG. 3 is a diagram illustrating an example of a property monitoring system 300. The electronic system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, x.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. Also, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information 536 and the state of the HVAC system components to the thermostat 334 and can control the one or more components of the HVAC system based on commands received from the thermostat 334.

The system 300 includes one or more mapping engines 357. Each of the one or more mapping engine 357 connects to control unit 310, e.g., through network 305. The mapping engines 357 can be computing devices (e.g., a computer, microcontroller, FPGA, ASIC, or other device capable of electronic computation) capable of receiving data related to the sensors 320 and communicating electronically with the monitoring system control unit 310 and monitoring server 360.

The mapping engine 357 receives data from one or more sensors 320. In some examples, the mapping engine 357 can be used to determine mapping of labels to sensors 320 based on data generated by sensors 320 (e.g., data from sensor 320 describing motion, movement, acceleration/velocity, orientation, and other parameters). The mapping engine 357 can receive data from the one or more sensors 320 through any combination of wired and/or wireless data links. For example, the mapping engine 357 can receive sensor data via a Bluetooth, Bluetooth LE, Z-wave, or Zigbee data link.

The mapping engine 357 communicates electronically with the control unit 310. For example, the mapping engine 357 can send data related to the sensors 320 to the control unit 310 and receive commands related to determining a mapping of labels and generating the multi-dimensional model 162 based on data from the sensors 320. In some examples, the mapping engine 357 processes or generates sensor signal data, for signals emitted by the sensors 320, prior to sending it to the control unit 310.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that enables the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

Also, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, 336, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events (e.g., alarm events) generated by the control unit 310. In this example, the monitoring server 360 may exchange electronic communications with the network module 314 included in the control unit 310 to receive information regarding events (e.g., alerts) detected by the control unit 310. The monitoring server 360 also may receive information regarding events (e.g., alerts) from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The central alarm station server 370 is an electronic device configured to provide alarm monitoring service by exchanging communications with the control unit 310, the one or more mobile devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring server 360 and/or the control unit 310 over the network 305. The user device 350 may be configured to display a smart home user interface 352 that is generated by the user device 350 or generated by the monitoring server 360. For example, the user device 350 may be configured to display a user interface (e.g., a web page) provided by the monitoring server 360 that enables a user to perceive images captured by the camera 330 and/or reports related to the monitoring system. Although FIG. 5 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, the robotic devices 390, and the mapping engine 357. The one or more user devices 340 and 350 receive data directly from the sensors 320, the home automation controls 322, the camera 330, the robotic devices 390, and the mapping engine 357 and sends data directly to the sensors 320, the home automation controls 322, the camera 330, the robotic devices 390, and the mapping engine 357. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, the robotic devices 390, and the mapping engine 357 are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, the robotic devices 390, and the mapping engine 357 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, the robotic devices 390, and the mapping engine 357 to a pathway over network 305 when the one or more user devices 340 and 350 are farther from the sensors 320, the home automation controls 322, the camera 330, the thermostat 334, the robotic devices 390, and the safety engine.

In some examples, the system leverages GPS information from the one or more user devices 340 and 350 to determine whether the one or more user devices 340 and 350 are close enough to the sensors 320, the home automation controls 322, the camera 330, the thermostat 334, the robotic devices 390, and the mapping engine 357 to use the direct local pathway or whether the one or more user devices 340 and 350 are far enough from the sensors 320, the home automation controls 322, the camera 330, the thermostat 334, the robotic devices 390, and the mapping engine 357 that the pathway over network 305 is required.

In other examples, the system leverages status communications (e.g., pinging) between the one or more user devices 340 and 350 and the sensors 320, the home automation controls 322, the camera 330, the thermostat 334, the robotic devices 390, and the mapping engine 357 to determine whether communication using the direct local pathway is possible. If communication using the direct local pathway is possible, the one or more user devices 340 and 350 communicate with the sensors 320, the home automation controls 322, the camera 330, the thermostat 334, the robotic devices 390, and the mapping engine 357 using the direct local pathway. If communication using the direct local pathway is not possible, the one or more user devices 340 and 350 communicate with the sensors 320, the home automation controls 322, the camera 330, the thermostat 334, the robotic devices 390, and the mapping engine 357 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising: storing, at a monitoring server, digital mapping information that indicates a plurality of navigable areas at a property, the digital mapping information includes a digital representation of the property; receiving, at the monitoring server, data indicative of one or more signals emitted from one or more sensors, wherein the monitoring server is configured to generate a data model utilizing a first data type, a second data type, and a third data type, the first data type indicative of a status or attribute of the one or more sensors, the second type indicative of communications with the one or more sensors, and the third data type indicative of a mapping of the property; determining, for the plurality of navigable areas, corresponding locations of the one or more sensors using the digital mapping information and the data indicative of one or more signals emitted from the one or more sensors; associating, at the monitoring server and for each of the plurality of navigable areas, the one or more sensors with digital representations of the corresponding locations of the one or more sensors; generating, using the corresponding locations of the one or more sensors, a digital label set comprising a plurality of labels that are descriptive of the one or more sensors, wherein at least one of the plurality of labels indicates a sensor type of the one or more sensors, and wherein the plurality of labels are generated utilizing an object detection neural network that infers one or more labels of the plurality of labels based on a visual scene analysis of a room at the property in which the one or more sensors is located; after generating the digital label set, i) updating, by the monitoring server, the digital mapping information with a mapping of a label in the digital label set using the corresponding locations of the one or more sensors and ii) updating, by the monitoring server, the digital mapping information to the one or more sensors; in response to generating the digital label set, generating, by the monitoring server, a multi-dimensional map of the property using the digital mapping information, digital representations of the corresponding locations of the one or more sensors, and imagery data; generating a topological graph configured to demonstrate one or more relationships between each respective sensor of the one or more sensors and a particular navigable space of the property, wherein the topological graph is operable to allow scene analysis of events occurring at the property as each of the one or more sensors report sensor data to the monitoring server; and transmitting the multi-dimensional map of the property to a second device for display of the multi-dimensional map by the second device.

2. The method of claim 1, comprising transmitting, by the monitoring server, information that includes:
   (i) parameter signals that characterize a status or attribute of the one or more sensors at the property;
   (ii) data that describes communications or interactions to or from each of the one or more sensors; and
   (iii) imagery data comprising visual information about the property and each of the one or more sensors.

3. The method of claim 2, comprising:
   obtaining, by the monitoring server, parameter signals, sensor communications, and the imagery data.

4. The method of claim 2, wherein generating the data model comprises:
   generating the data model and the multi-dimensional map using context data provided to the monitoring server by a user of a system.

5. The method of claim 3,
   wherein the multi-dimensional map indicates the location and status of each of the one or more sensors.

6. The method of claim 5, wherein the topological graph is operable to allow an algorithmic analysis of events occurring at the property as each of a plurality of sensors report sensor data to the monitoring server.

7. The method of claim 2, comprising:
   initiating, at the monitoring server, sensor discovery at the property using a visual discovery mode, a triggered sensor discovery mode, or both.

8. The method of claim 7, wherein performing sensor discovery using the visual discovery mode comprises:
   obtaining, at the monitoring server, images of the one or more sensors, wherein the images of the one or more sensors were analyzed by an object detection neural network.

9. The method of claim 8, comprising:
   determining the corresponding locations of the one or more sensors at each navigable area using the plurality of frames of imagery data that are processed by the object detection neural network.

10. The method of claim 9, wherein generating the digital label set comprises:
    inferring, by the object detection neural network, one or more labels of the digital label set using a visual scene analysis of a room in which the one or more sensors is located in a particular type of the room; and
    generating the digital label set using one or more labels that are inferred by the object detection neural network using the particular type of the room and visual observation of the one or more sensors in the room.

11. The method of claim 1, wherein storing the mapping information comprises:
    storing, at the monitoring server, a list of the one or more sensors.

12. A system comprising a processor and a non-transitory machine-readable storage medium storing instructions that are executable by the processor to cause performance of operations comprising: storing, at a monitoring server, mapping information that indicates a plurality of navigable areas at a property, the mapping information includes a digital representation of the property; receiving, at the monitoring server, data indicative of one or more signals emitted from one or more sensors, wherein the monitoring server is configured to generate a data model utilizing a first data type, a second data type, and a third data type, the first data type indicative of a status or attribute of the one or more sensors, the second type indicative of communications with the one or more sensors, and the third data type indicative of a mapping of the property; determining, for the plurality of navigable areas, corresponding locations of the one or more sensors using the mapping information and the data indicative of one or more signals emitted from the one or more sensors; associating, at the monitoring server and for each of the plurality of navigable areas, the one or more sensors with digital representations of the corresponding locations of the one or more sensors; generating, using the corresponding locations of the one or more sensors, a digital label set comprising a plurality of labels that are descriptive of the one or more sensors, wherein at least one of the plurality of labels indicates a sensor type of the one or more sensors, and wherein the plurality of labels are generated utilizing an object detection neural network that infers one or more labels of the plurality of labels based on a visual scene analysis of a room at the property in which the one or more sensors is located; after generating the digital label set, (i) updating, by the monitoring server, the mapping information with a mapping of a label in the digital label set using the corresponding locations of the one or more sensors and (ii) updating, by the monitoring server, the digital mapping information to the one or more sensors; in response to generating the digital label set, generating, by the monitoring server, a multi-dimensional map of the property using the mapping information, corresponding locations of the one or more sensors, and imagery data; generating a topological graph configured to demonstrate one or more relationships between each respective sensor of the one or more sensors and a particular navigable space of the property, wherein the topological graph is operable to allow scene analysis of events occurring at the property as each of the one or more sensors report sensor data to the monitoring server; and transmitting the multi-dimensional map of the property to a second device for display of the multi-dimensional map by the second device.

13. The system of claim 12, wherein the operations comprise transmitting, by the monitoring server, information that includes:
    (i) parameter signals that characterize a status or attribute of the one or more sensors at the property;
    (ii) data that describes communications or interactions between each of the one or more sensors; and
    (iii) imagery data comprising visual information about the property and each of the one or more sensors.

14. The system of claim 13, wherein the operations comprise:
    obtaining, by the monitoring server, parameter signals, sensor communications, and the imagery data.

15. The system of claim 14,
    wherein the multi-dimensional map indicates the location and status of each of the one or more sensors; and wherein the topological graph is operable to allow an algorithmic analysis of events occurring at the property as each of the one or more sensors report sensor data to the monitoring server.

16. The system of claim 13, wherein generating the data model comprises:
generating the data model and the multi-dimensional map using context data provided to the monitoring server by a user of the system.

17. The system of claim 14, comprising:
initiating, at the monitoring server, sensor discovery at the property using a visual discovery mode, a triggered sensor discovery mode, or both.

18. The system of claim 17, comprising:
obtaining, at the monitoring server, images of the one or more sensors, wherein the images of the one or more sensors were analyzed by an object detection neural network.

19. The system of claim 18, comprising:
determining the locations of the one or more sensors at each navigable area using the plurality of frames of imagery data that are processed by the object detection neural network.

20. A non-transitory machine-readable storage medium storing instructions for performing mapping operations of a system configured to monitor a property using a monitoring server of the system, the instructions being executable by a processor to cause performance of operations comprising: storing, at the monitoring server, mapping information that indicates a plurality of navigable areas at the property, the mapping information includes a digital representation of the property; receiving, at the monitoring server, data indicative of one or more signals emitted from one or more sensors, wherein the monitoring server is configured according to generate a data model utilizing a first data type, a second data type, and a third data type, the first data type indicative of a status or attribute of the one or more sensors, the second type indicative of communications with the one or more sensors, and the third data type indicative of a mapping of the property; determining, for the plurality of navigable areas, corresponding locations of the one or more sensors using the mapping information and the data indicative of one or more signals emitted from the one or more sensors; associating, at the monitoring server and for each of the plurality of navigable areas, the one or more sensors with digital representations of the corresponding locations of the one or more sensors; generating, using the corresponding locations of the one or more sensors, a digital label set comprising a plurality of labels that are descriptive of the one or more sensors, wherein at least one of the plurality of labels indicates a sensor type of the one or more sensors, and wherein the plurality of labels are generated utilizing an object detection neural network that infers one or more labels of the plurality of labels based on a visual scene analysis of a room at the property in which the one or more sensors is located; after generating the digital label set, (i) updating, by the monitoring server, the mapping information with a mapping of a label in the digital label set using the corresponding locations of the one or more sensors and (ii) updating, by the monitoring server, the digital mapping information to the one or more sensors; and in response to generating the digital label set, generating, by the monitoring server, a multi-dimensional map of the property using the mapping information, corresponding locations of the one or more sensors, and imagery data; generating a topological graph configured to demonstrate one or more relationships between each respective sensor of the one or more sensors and a particular navigable space of the property, wherein the topological graph is operable to allow scene analysis of events occurring at the property as each of the one or more sensors report sensor data to the monitoring server; and transmitting the multi-dimensional map of the property to a second device for display of the multi-dimensional map by the second device.

21. A method comprising:
storing, at a monitoring server, digital mapping information that indicates a plurality of navigable areas at a property, the digital mapping information includes a digital representation of the property;
receiving, at the monitoring server, data indicative of one or more signals emitted from one or more sensors, wherein the monitoring server is configured to generate a data model utilizing a first data type, a second data type, and a third data type, the first data type indicative of a status or attribute of the one or more sensors, the second type indicative of communications with the one or more sensors, and the third data type indicative of a mapping of the property;
determining, for the plurality of navigable areas, corresponding locations of the one or more sensors using the digital mapping information and the data indicative of one or more signals emitted from the one or more sensors;
associating, at the monitoring server and for each of the plurality of navigable areas, the one or more sensors with digital representations of the corresponding locations of the one or more sensors;
generating, using the corresponding locations of the one or more sensors, a digital label set comprising a plurality of labels that are descriptive of the one or more sensors,
wherein at least one of the plurality of labels indicates a sensor type of the one or more sensors, and wherein the plurality of labels are generated utilizing an object detection neural network that infers one or more labels of the plurality of labels based on a visual scene analysis of a room at the property in which the one or more sensors is located;
after generating the digital label set, i) updating, by the monitoring server, the digital mapping information with a mapping of a label in the digital label set using the corresponding locations of the one or more sensors and ii) updating, by the monitoring server, the digital mapping information to the one or more sensors;
in response to generating the digital label set, generating, by the monitoring server, a multi-dimensional map of the property using the digital mapping information, digital representations of the corresponding locations of the one or more sensors, and imagery data
generating a topological graph configured to demonstrate one or more relationships between each respective sensor of the one or more sensors and a particular navigable space of the property, wherein the topological graph is operable to allow algorithmic analysis of events occurring at the property as each of the one or more sensors report sensor data to the monitoring server; and
transmitting the multi-dimensional map of the property to a second device for display of the multi-dimensional map by the second device.

* * * * *